(12) United States Patent
Tsuchida et al.

(10) Patent No.: US 12,505,189 B2
(45) Date of Patent: Dec. 23, 2025

(54) CONTENT GENERATION APPARATUS CAPABLE OF GUARANTEEING THAT PROVIDER OF CONTENT IS GENERATOR OF THE CONTENT, MANAGEMENT SERVER, CONTROL METHOD FOR CONTENT GENERATION APPARATUS, CONTROL METHOD FOR MANAGEMENT SERVER, AND STORAGE MEDIUM

(71) Applicant: CANON KABUSHIKI KAISHA, Tokyo (JP)

(72) Inventors: Naohiko Tsuchida, Tokyo (JP); Daiyu Ueno, Kanagawa (JP); Minoru Sakaida, Kanagawa (JP); Atsushi Fujita, Tokyo (JP); Keiichiro Kubo, Saitama (JP); Keisuke Tanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 190 days.

(21) Appl. No.: 18/458,808

(22) Filed: Aug. 30, 2023

(65) Prior Publication Data
US 2024/0070250 A1  Feb. 29, 2024

(30) Foreign Application Priority Data
Aug. 30, 2022 (JP) .................. 2022-137142

(51) Int. Cl.
*G06F 21/32* (2013.01)
*G06V 40/12* (2022.01)
(Continued)

(52) U.S. Cl.
CPC .......... *G06F 21/32* (2013.01); *G06V 40/1365* (2022.01); *G06V 40/197* (2022.01); *H04L 9/50* (2022.05)

(58) Field of Classification Search
CPC ................................. G06F 21/32; H04L 9/50
(Continued)

(56) References Cited

U.S. PATENT DOCUMENTS 8,351,664 B2 * 1/2013 Abe .................. G06F 21/32
382/124
10,602,202 B1 * 3/2020 Taylor .................. G06F 16/48
(Continued)

FOREIGN PATENT DOCUMENTS

JP    2017204706 A    11/2017

*Primary Examiner* — Dant B Shaifer Harriman
(74) *Attorney, Agent, or Firm* — Canon U.S.A., Inc. IP Division

(57) ABSTRACT

A content generation apparatus capable of guaranteeing that a provider of a content is a generator of the content is provided. The content generation apparatus that generates a content according to an instruction received from a user includes an acquisition unit configured to acquire biometric information of the user, a biometric authentication unit configured to perform biometric authentication of the user based on the biometric information of the user, a hash value generation unit configured to generate a hash value of the content in a case that the biometric authentication of the user has succeeded, and a communication unit configured to transmit the content and information of the content to a management server that registers the hash value and the information of the content in a blockchain. The information of the content includes result information indicating a result of the biometric authentication of the user.

6 Claims, 9 Drawing Sheets

(51) Int. Cl.
*G06V 40/18* (2022.01)
*H04L 9/00* (2022.01)

(58) Field of Classification Search
USPC .......................................................... 713/186
See application file for complete search history.

(56) References Cited

U.S. PATENT DOCUMENTS

| | | | | |
|---|---|---|---|---|
| 10,755,237 | B2* | 8/2020 | Song | G06Q 20/3829 |
| 10,776,786 | B2* | 9/2020 | Song | H04L 9/3231 |
| 10,832,244 | B1* | 11/2020 | Chowdhury | G06F 21/32 |
| 11,949,673 | B1* | 4/2024 | Sanchez | H04L 63/0853 |
| 12,355,890 | B2* | 7/2025 | Kaga | H04L 9/0822 |
| 2017/0257358 | A1* | 9/2017 | Ebrahimi | H04L 9/3236 |
| 2017/0316497 | A1* | 11/2017 | Song | H04L 9/3268 |
| 2018/0121635 | A1* | 5/2018 | Tormasov | H04L 9/3236 |
| 2019/0012673 | A1* | 1/2019 | Chakraborty | G07D 7/206 |
| 2020/0007333 | A1* | 1/2020 | Young | H04L 9/50 |
| 2020/0042497 | A1* | 2/2020 | Pillai | G06F 16/182 |
| 2020/0145219 | A1* | 5/2020 | Sebastian | H04L 9/50 |
| 2020/0242606 | A1* | 7/2020 | Logan | G06Q 20/405 |
| 2020/0304503 | A1* | 9/2020 | Zerrad | H04L 63/10 |
| 2021/0035109 | A1* | 2/2021 | Wong | G07F 7/0833 |
| 2022/0277070 | A1* | 9/2022 | Robert Jose | G06F 21/45 |
| 2024/0070250 | A1* | 2/2024 | Tsuchida | H04L 9/3239 |
| 2024/0184871 | A1* | 6/2024 | Tanaka | H04L 9/3231 |
| 2024/0243933 | A1* | 7/2024 | Fujita | H04L 9/3239 |
| 2024/0275618 | A1* | 8/2024 | Arifuku | H04L 9/3239 |
| 2024/0430112 | A1* | 12/2024 | Anisetti | H04L 9/3239 |

* cited by examiner

FIG. 5

| BLOCK ID | AUTHENTICITY GUARANTEE NUMBER | IMAGE FILE NAME | BIOMETRIC AUTHENTICATION RESULT INFORMATION |
|---|---|---|---|
| 0 | 0000000000000000 | IMG_0000.JPG | SUCCESS |
| 1 | 5432456667777773 | IMG_0001.JPG | SUCCESS |
| 2 | 0988501939374728 | IMG_0002.JPG | SUCCESS |
| 3 | 1111220034355050 | IMG_0003.JPG | SUCCESS |
| 4 | 3322344567777888 | IMG_0004.JPG | SUCCESS | ically shows a configuration of the image pickup apparatus shown in FIG. 1.

CONTENT GENERATION APPARATUS CAPABLE OF GUARANTEEING THAT PROVIDER OF CONTENT IS GENERATOR OF THE CONTENT, MANAGEMENT SERVER, CONTROL METHOD FOR CONTENT GENERATION APPARATUS, CONTROL METHOD FOR MANAGEMENT SERVER, AND STORAGE MEDIUM

BACKGROUND

Field

The present disclosure relates to a content generation apparatus, a management server, a control method for the content generation apparatus, a control method for the management server, and a storage medium.

Description of the Related Art

In recent years, information sharing by the Internet and social networking services (SNS) has become active, anyone is able to view and transmit information. Under such circumstances, since the technology for digital image processing has further advanced, it has become difficult for a viewer of information to confirm the authenticity of the content of the information, so that problems such as fake news have become serious. In order to cope with such problems, there is an increasing demand for a mechanism that guarantees the authenticity of digital images (i.e., guarantees that no processing or falsification has been performed with respect to the digital images).

As the mechanism for guaranteeing the authenticity of the digital images, the use of a blockchain technology widely utilized in various kinds of industries including finance has been studied. The blockchain technology can prevent falsification of digital data in a decentralized manner and at low cost. For example, a management system using the blockchain technology registers a hash value of a content and metadata accompanying the content in a blockchain, and guarantees the authenticity of the content from the time of generation of the content (for example, see Japanese Laid-Open Patent Publication (kokai) No. 2017-204706). As a result, it becomes possible to acquire a content that has not been processed from the time of generation from the management system and publish the acquired content on the Internet, the SNS, or the like.

However, even in a case where the above-described management system is used, it is not guaranteed the authenticity of whether a provider of the content is a generator of the content. For this reason, it is difficult to determine whether the provider of the content published on the Internet, the SNS, or the like is the generator of the content or an imposter. Japanese Laid-Open Patent Publication (kokai) No. 2017-204706 described above does not mention the confirmation of whether the provider of the content is the generator of the content, and thus there is room for further improvement.

SUMMARY

The present disclosure provides a content generation apparatus capable of guaranteeing that a provider of a content is a generator of the content, a management server, a control method for the content generation apparatus, a control method for the management server, and a storage medium.

According to an aspect of the present disclosure, a content generation apparatus that generates a content according to an instruction received from a user, the content generation apparatus includes an acquisition unit configured to acquire biometric information of the user, a biometric authentication unit configured to perform biometric authentication of the user based on the biometric information of the user, a hash value generation unit configured to generate a hash value of the content in a case that the biometric authentication of the user has succeeded, and a communication unit configured to transmit the content and information of the content to a management server that registers the hash value and the information of the content in a blockchain. The information of the content includes result information indicating a result of the biometric authentication of the user.

Accordingly, the present disclosure provides a management server that manages a content generated by a content generation apparatus according to an instruction received from a user, the management server comprising a reception unit configured to receive the content, information of the content, and a hash value of the content, a determination unit configured to determine whether or not biometric authentication of the user who has instructed generation of the content has succeeded based on result information indicating a result of the biometric authentication of the user included in the information of the content, a generation unit configured to generate a hash value based on the content and the information of the content, and a registration unit configured to, in a case that the received hash value and the generated hash value coincide with each other and it is determined that the biometric authentication of the user has succeeded, register the hash value and the information of the content in a blockchain.

According to the present disclosure, it is possible to guarantee that the provider of the content is the generator of the content.

Further features of the present disclosure will become apparent from the following description of exemplary embodiments with reference to the attached drawings.

BRIEF DESCRIPTION OF THE DRAWINGS

FIG. 5 is a diagram that shows an example of a configuration of an image database shown in FIG. 4.

DESCRIPTION OF THE EMBODIMENTS

The present disclosure will now be described in detail below with reference to the accompanying drawings showing embodiments thereof.

Figure 1:
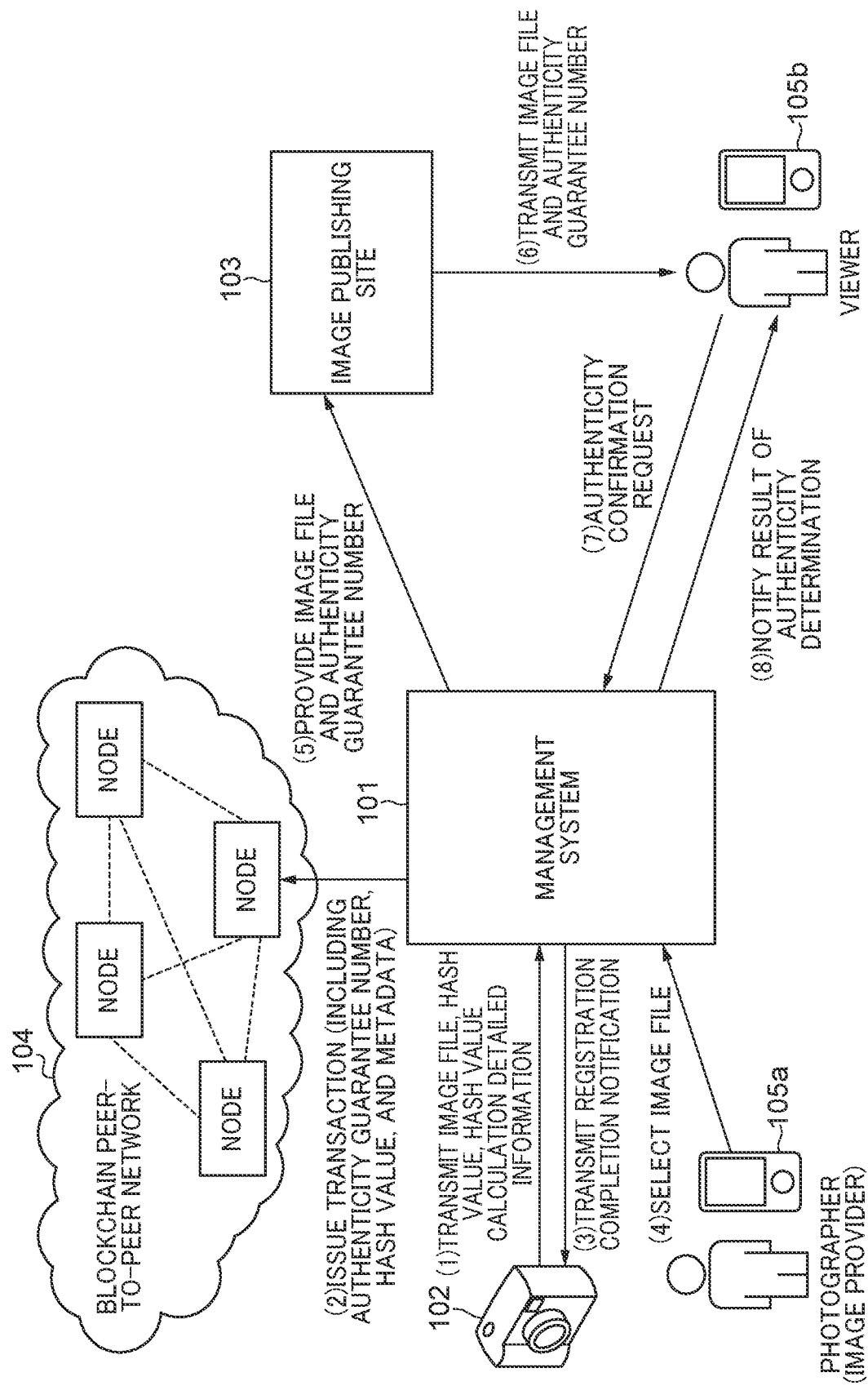
FIG. 1 is a diagram for explaining functions of a management system that communicates with an image pickup apparatus functioning as a content generation apparatus according to an embodiment of the present disclosure.

FIG. 1 is a diagram for explaining functions of a management system 101 that communicates with an image pickup apparatus 102 functioning as a content generation apparatus according to an embodiment of the present disclosure.

The management system 101 functioning as a management server includes a function of managing contents acquired from an external apparatus such as the image pickup apparatus 102 via the Internet or the like. The management system 101 is implemented by one or more computer apparatuses. It should be noted that in the preferred embodiment of the present disclosure, although a configuration, in which the management system 101 also communicates with and uses a blockchain peer-to-peer network 104, will be described below, the present disclosure is not limited to this configuration, and may be implemented by using another network.

As shown in FIG. 1, when the image pickup apparatus 102 performs a photographing operation (an image pickup operation), the image pickup apparatus 102 associates an image file, a hash value (an image hash value), and hash value calculation detailed information that are obtained by the photographing operation with each other, and then transmits them to the management system 101 (a step (1)).

The image file includes image data and metadata. The image data is still image data or moving image data. The metadata includes attribute information of the image data that indicates a photographer of the image data, a photographing time, a photographing location, a model of the image pickup apparatus, setting values at the time of photographing, etc. Further, the metadata includes result information of biometric authentication of the photographer, which will be described below. The biometric authentication may be any type of biometric authentication as long as the biometric authentication is personal authentication using biometric information such as fingerprint authentication, retina authentication, voice authentication, or the like. However, from the viewpoint of convenience, the biometric authentication can be personal authentication using biometric information acquired when performing the photographing operation. For example, it is possible to acquire fingerprint information used for the fingerprint authentication from a shutter button that has been pressed by a user at the time of photographing. Further, it is possible to acquire retina information used for the retina authentication from a finder, through which the user has looked at the time of photographing. Moreover, it is possible to acquire voice information used for the voice authentication from a microphone. Although the biometric information acquired by the image pickup apparatus 102 may be one type of biometric information, from the viewpoint of security, the image pickup apparatus 102 can acquire a plurality of types of biometric information.

The hash value is a value obtained by executing a hash function with respect to the image file at the time of generation.

The hash value calculation detailed information is information describing how to thin out the image data included in the image file in the case of thinning out the image data included in the image file and applying the hash function to it. It should be noted that an algorithm of the hash function to be used may be only a default algorithm, or one of a plurality of algorithms such as the secure hash algorithm 256-bit (SHA256) and the message digest algorithm 5 (MD5) may be selected as the algorithm of the hash function to be used. In the latter case, the algorithm used for the hash value calculation is also described in the hash value calculation detailed information. For example, in the case of hashing the image data by the SHA256, the SHA256 is an algorithm that generates a hash value of 32 bytes (256 bits) by repeatedly performing an arithmetic processing on the image data from the beginning to the end of the image data by 64 bytes. Repeatedly using 64 bytes from the beginning of the image data for the arithmetic processing and skipping the next 64 bytes without using for the arithmetic processing with respect to all the image data will halve a computational amount of the arithmetic processing. The hash value calculation detailed information in this case can be expressed as "Algorithm, SHA256, Read, 64, Skip, 64" or the like in a comma separated value (CSV) file format. Furthermore, in the case that the image data is moving image data, it is also possible to apply the hash function to every frame of the moving image data. The hash value calculation detailed information in this case can be expressed as "Algorithm, SHA256, SkipFrame, 1," or the like in the CSV file format. Further, in combination with this, even within one frame, all the data is not used but the data can be thinned out. The hash value calculation detailed information in this case can be expressed as "Algorithm, SHA256, SkipFrame, 1, Read, 64, Skip, 64" or the like in the CSV file format.

It should be noted that the format of the hash value calculation detailed information is not limited to the CSV file format. For example, the format of the hash value calculation detailed information may be a widely-used file format such as a JavaScript object notation (JSON) file format, or a unique file format.

It should be noted that in an embodiment of the present disclosure, although the configuration, in which the image pickup apparatus 102 generates the hash value and transmits the hash value to the management system 101, will be described below, the present disclosure is not limited to this configuration, and for example, the management system 101 may generate the hash value based on the image file acquired from the image pickup apparatus 102.

Upon receiving the image file, the hash value, and the hash value calculation detailed information from the image pickup apparatus 102, the management system 101 generates an authenticity guarantee number, which is a unique number within the management system 101. The authenticity guarantee number is an identification number for uniquely identifying the image file.

The management system 101 generates transaction data, which includes the authenticity guarantee number, and information of the image file such as the metadata, the hash value, and the hash value calculation detailed information, and connects a block, into which the generated transaction data has been written, to a blockchain. Specifically, the management system 101 issues the generated transaction data and broadcasts the transaction data to one or more computers (nodes) participating in the blockchain peer-to-peer network 104 (a step (2)). Accordingly, the transaction data is temporarily stored in a transaction pool, and a verification is completed when the transaction data is approved by a miner. Then, the block, into which the transaction data has been written, is generated, and is added to the tail of the blockchain. As a result, the information of the image file is registered in the blockchain.

After connecting the block, into which the transaction data has been written, to the blockchain, the management system 101 associates the image file with the authenticity guarantee number and stores (provides) them in (to) an image database 408 shown in FIG. 4, which will be described below. Then, the management system 101 transmits a registration completion notification, which indicates that a processing of registering the information of the image file in the blockchain is completed, to the image pickup apparatus 102 (a step (3)). After that, the management system 101 allows the user (for example, the photographer (an image provider)) to select an image file to be published on an image publishing site 103 from a plurality of image files registered in the image database 408 (a step (4)). Specifically, the user is able to access a webpage of the management system 101 from a communication device 105a operated by the user and select the image file to be published on the image publishing site 103 on the webpage. The management system 101 provides the image file selected by the user and the authenticity guarantee number associated with the image file to the image publishing site 103 (a step (5)). At the same time, the management system 101 notifies the communication device 105a that the image file selected by the user in the step (4) can be published on the image publishing site 103.

The image publishing site 103 performs a display control so that the authenticity guarantee number provided from the management system 101 together with the image file is displayed, for example, in the vicinity of the image file on the webpage. It should be noted that the display position of the authenticity guarantee number (the vicinity of the image file) is an example, and the authenticity guarantee number may be displayed at a position where a viewer of the image publishing site 103 can recognize that it is the authenticity guarantee number corresponding to the image file.

The viewer of the image publishing site 103 may want to confirm that the image file displayed on the webpage of the image publishing site 103 has not been falsified since the time of photographing. In this case, the viewer first uses a communication device 105b to acquire (download) the image file and the authenticity guarantee number associated with the image file from the image publishing site 103 (a step (6)). Specifically, the viewer accesses the webpage of the image publishing site 103 from the communication device 105b, selects the image file published on the webpage, and issues an instruction to perform a download. In response to this instruction, the image publishing site 103 transmits the selected image file and the authenticity guarantee number to the communication device 105b.

Upon the completion of the download, the communication device 105b transmits an authenticity confirmation request of the image file together with the acquired image file and the acquired authenticity guarantee number to the management system 101 (a step (7)). In this embodiment, the authenticity confirmation request is made by the viewer using the communication device 105b to attach the image file and the authenticity guarantee number that are acquired from the image publishing site 103 to an input form provided by the management system 101. However, the method for making the authenticity confirmation request is not limited to the method used in this embodiment, and for example, the authenticity confirmation request may be made by transmitting an e-mail, to which the image file and the authenticity guarantee number are attached, to the management system 101.

When the authenticity confirmation request is transmitted from the communication device 105b, the management system 101 performs an authenticity determination of the image file, which is a target of the authenticity confirmation request. It should be noted that in this embodiment, although the timing for performing the authenticity determination is when the management system 101 accepts the authenticity confirmation request of the image data displayed on the image publishing site 103 from the communication device 105b of the viewer of the image publishing site 103, the timing for performing the authenticity determination is not limited to this. For example, the management system 101 may periodically perform the authenticity determination based on the image database 408. The management system 101 displays the result of the authenticity determination on the webpage of the management system 101, or notifies the result of the authenticity determination to the communication device 105b by e-mail (a step (8)).

Figure 2:
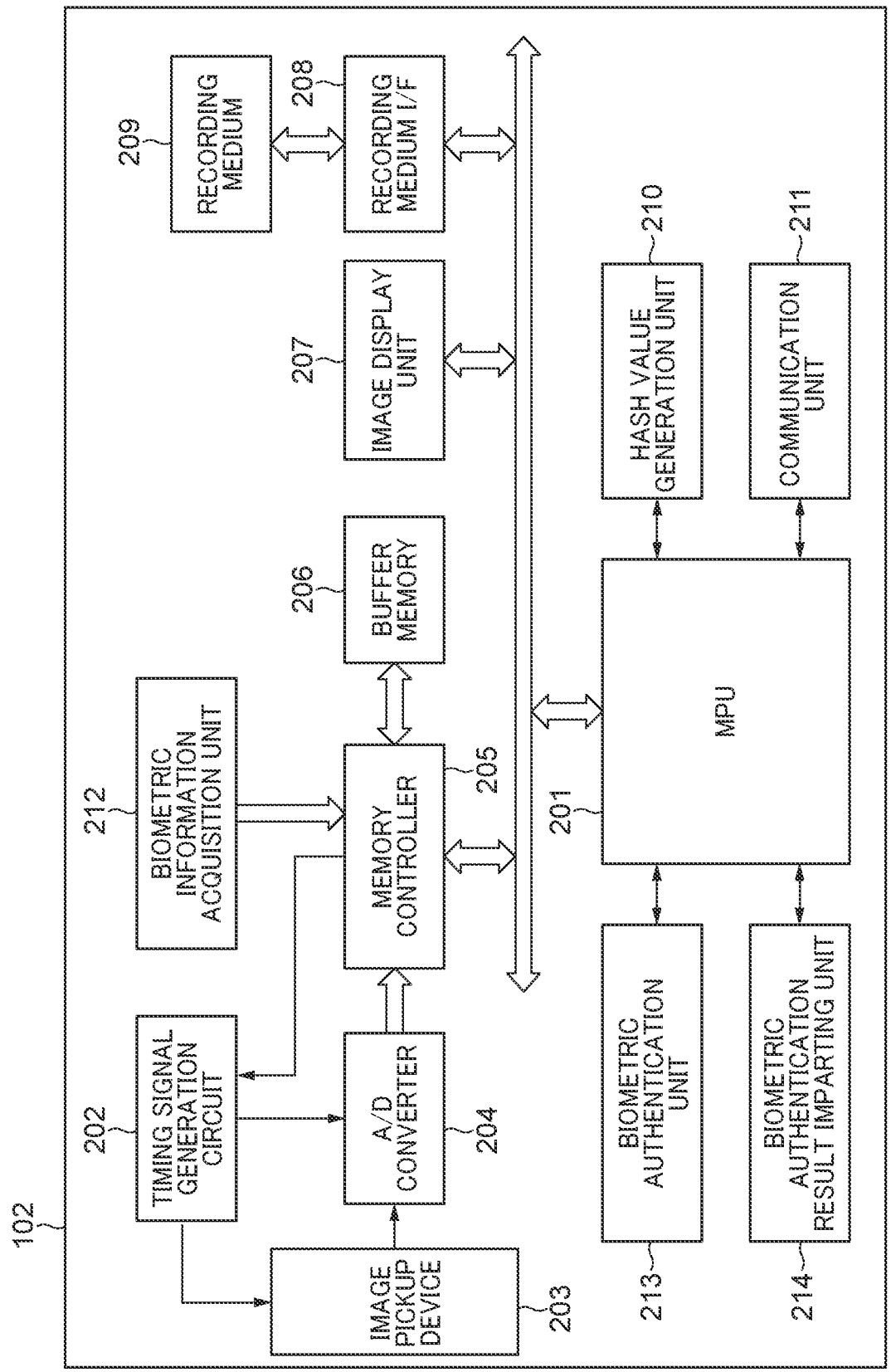
FIG. 2 is a block diagram that schematically shows a configuration of the image pickup apparatus shown in FIG. 1.

FIG. 2 is a block diagram that schematically shows a configuration of the image pickup apparatus 102 shown in FIG. 1. The image pickup apparatus 102 is a camera such as a digital camera or a digital video camera, or an electronic device having a camera function such as a mobile phone having a camera function or a camera-equipped computer.

As shown in FIG. 2, the image pickup apparatus 102 includes an MPU 201, a timing signal generation circuit 202, an image pickup device 203, an A/D converter 204, a memory controller 205, a buffer memory 206, and an image display unit 207. In addition, the image pickup apparatus 102 includes a recording medium I/F 208, a recording medium 209, a hash value generation unit 210, a communication unit 211, a biometric information acquisition unit 212, a biometric authentication unit 213, and a biometric authentication result imparting unit 214.

The MPU 201 is a microcontroller for performing a control related to the system of the image pickup apparatus 102 such as a photographing sequence.

The timing signal generation circuit 202 generates a timing signal necessary for operating the image pickup device 203.

The image pickup device 203 is an image pickup device such as a CCD image sensor or a CMOS image sensor that converts reflected light from a subject into electrical signals (analog image data) and reads out the electrical signals to the A/D converter 204.

The A/D converter 204 converts the analog image data, which is read out from the image pickup device 203, into digital image data. Hereinafter, the digital image data will be simply referred to as "image data".

The memory controller 205 controls reading and writing of the image file from and to the buffer memory 206, a refresh operation of the buffer memory 206, etc. The image file is an image file generated by the MPU 201 as described below, in which metadata thereof is added to the image data. Details will be described below.

The buffer memory 206 stores the image file.

The image display unit 207 displays the image file stored in the buffer memory 206.

The recording medium I/F 208 is an interface for controlling reading and writing of data from and to the recording medium 209.

The recording medium 209 is, for example, a storage medium capable of being inserted into and removed from the image pickup apparatus 102 such as a memory card, and stores programs, image files, etc.

The hash value generation unit 210 generates (calculates) the hash value by executing the hash function with respect to the image file stored in the buffer memory 206. It should be noted that instead of the hash value generation unit 210, the MPU 201 may perform the generation of the hash value. Furthermore, the hash value may be generated by executing the hash function with respect to the image data instead of the image file.

The communication unit 211 is connected to the Internet to transmit and receive data to and from an external apparatus.

The biometric information acquisition unit 212 acquires the biometric information such as the fingerprint information, the retina information, and/or the voice information. It should be noted that the biometric information acquisition unit 212 is provided in the image pickup apparatus 102 with a configuration suitable for the type(s) of the biometric information to be acquired. The biometric information acquired by the biometric information acquisition unit 212 is transferred to the biometric authentication unit 213 via the memory controller 205 and the MPU 201.

The biometric authentication unit 213 performs the biometric authentication that compares the biometric information outputted from the biometric information acquisition unit 212 with authentication information registered in advance. It should be noted that in this embodiment, the biometric information acquired by the biometric information acquisition unit 212 may be registered as the authentication information, or the image pickup apparatus 102 may receive the biometric information from an external apparatus having a function of acquiring the biometric information and may register the received biometric information as the authentication information. The result information of the biometric authentication obtained by the biometric authentication unit 213 is outputted to the MPU 201. The biometric authentication result imparting unit 214 performs a control that imparts the result information of the biometric authentication to the metadata.

Figure 3:
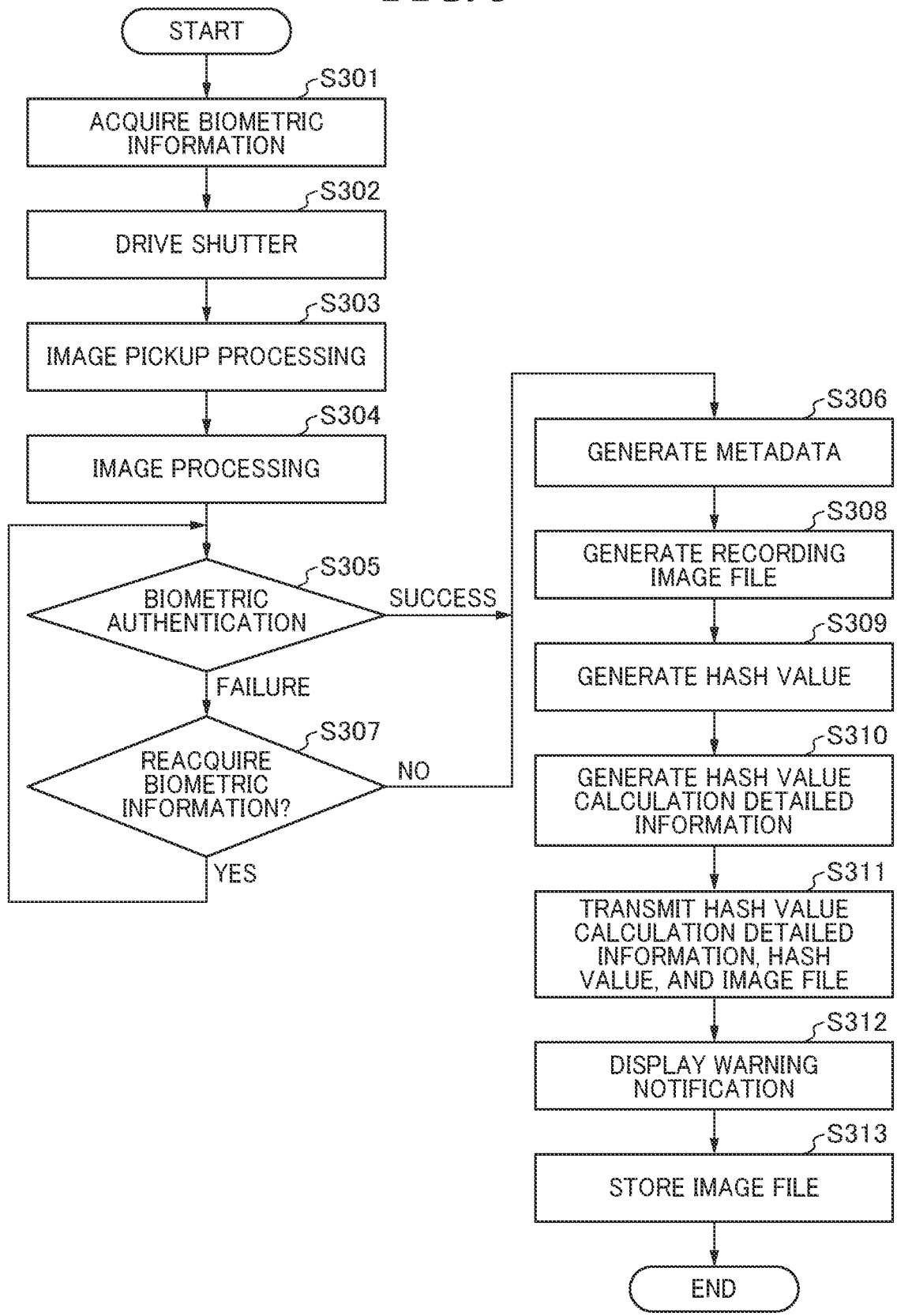
FIG. 3 is a flowchart that shows a procedure of a data transmission processing executed by the image pickup apparatus shown in FIG. 1.

FIG. 3 is a flowchart that shows a procedure of a data transmission processing executed by the image pickup apparatus 102 shown in FIG. 1. The data transmission processing shown in FIG. 3 is implemented by the MPU 201 of the image pickup apparatus 102 executing the program stored in the recording medium 209 or the like. The data transmission processing shown in FIG. 3 is started when the image pickup apparatus 102 accepts a photographing start operation such as pressing down of a photographing button (not shown) of the image pickup apparatus 102 performed by the photographer.

As shown in FIG. 3, the MPU 201 controls the biometric information acquisition unit 212 to acquire the biometric information of the photographer who has performed the photographing start operation (a step S301). Next, in order to control an exposure time, the MPU 201 drives a shutter (not shown) disposed on the subject side of the image pickup device 203 (a step S302).

Next, the MPU 201 performs an image pickup processing that converts the light from the subject, which is received by the image pickup device 203 via the shutter, into the electrical signals (the analog image data) (a step S303).

Next, the MPU 201 performs image processes such as development and encoding with respect to the electrical signals obtained by the image pickup processing (a step S304). As a result, the image data is generated. It should be noted that a photographing unit that photographs the subject is configured by the image pickup device 203, the A/D converter 204, the shutter, and the MPU 201.

Next, the MPU 201 controls the biometric authentication unit 213 to perform the biometric authentication by using the biometric information acquired in the step S301 (a step S305). It should be noted that in this embodiment of the present disclosure, as an example, although the biometric information is acquired at the timing immediately before the shutter is driven, the timing for acquiring the biometric information is not limited to this timing. The timing for acquiring the biometric information may be another timing as long as it is after the photographing start operation is accepted and is before the process of the step S305 is executed.

In the case that the biometric authentication performed in the step S305 has succeeded, that is, in the case that the biometric information of the photographer acquired in the step S302 matches the authentication information registered in advance, the MPU 201 generates metadata (a step S306). This metadata includes the attribute information when the image pickup processing for generating the image data is executed (the photographer, the photographing time, the photographing location, the model of the image pickup apparatus, the setting values at the time of photographing, etc.). Further, as the result information of the biometric authentication, this metadata includes information indicating the photographer, specifically, information indicating that the biometric authentication of the photographer has succeeded. Next, the processing proceeds to a step S308 described below.

In the case that the biometric authentication performed in the step S305 has failed, that is, in the case that the biometric information of the photographer acquired in the step S302 does not match the authentication information registered in advance, the MPU 201 controls the biometric information acquisition unit 212 to perform a processing of reacquiring the biometric information. Next, the MPU 201 determines whether or not the biometric information has been reacquired (a step S307).

In the case that the MPU 201 determines in the step S307 that the biometric information has been reacquired, the processing returns to the step S305, and the MPU 201 performs the biometric authentication by using the reacquired biometric information.

In the case that the MPU 201 determines in the step S307 that the biometric information has not been reacquired, the processing proceeds to the step S306, and the MPU 201 generates metadata. This metadata includes the attribute information described above and does not include the result information of the biometric authentication. It should be noted that in this embodiment, although the configuration, in which the metadata not including the result information of the biometric authentication is generated in the case of being determined that the biometric authentication performed in the step S305 has failed and being determined by the MPU 201 in the step S307 that the biometric information has not been reacquired, has been described, the present disclosure is not limited to this configuration. For example, in the case of being determined that the biometric authentication performed in the step S305 has failed and being determined by the MPU 201 in the step S307 that the biometric information has not been reacquired, as the result information of the biometric authentication, the metadata including information indicating that the biometric authentication of the photographer has failed may be generated.

Next, the MPU 201 generates an image file in a JPEG format, an MPEG format, or the like, in which the metadata described above is added to the image data described above (the step S308).

Next, the MPU 201 controls the hash value generation unit 210 to execute the hash function with respect to binary data of the generated image file to generate the hash value (a step S309).

Further, at the time of the generation (calculation) of the hash value, the hash value may be generated while a part of the binary data of the image file is skipped. In this case, the MPU 201 generates the hash value calculation detailed information, in which how the binary data of the image file has been skipped (the thinning-out method) is recorded (a step S310).

Next, the MPU 201 controls the communication unit 211 to transmit the hash value and the image file to the management system 101 (a step S311). At this time, in the case that the hash value calculation detailed information has been generated in the step S310, the hash value calculation detailed information is also transmitted to the management system 101. It should be noted that the data to be transmitted in the step S311 may be subjected to an encryption processing. Further, the MPU 201 causes the image display unit 207 to display a warning notification (a step S312). This warning notification is displayed on the image display unit 207, for example, until the registration completion notification from the management system 101 is received. This warning notification is a notification for calling attention not to insert or remove the recording medium 209, for example, until the registration in the blockchain is completed. As a result, it is possible to prevent failure of the processing of registering the information of the image file in the blockchain or a processing of adding the registered information to the image file described below due to the insertion and removal of the recording medium 209.

Next, the MPU 201 stores the image file in the recording medium 209 (a step S313), and ends the data transmission processing shown in FIG. 3.

As described above, in this embodiment, when the image pickup apparatus 102 performs the image pickup processing, not only the image file including the image data and the metadata is recorded in the recording medium 209, but also the image file and the hash value thereof are transmitted to the management system 101. In addition, in the case that the hash value calculation detailed information has been generated in the step S307, the hash value calculation detailed information is also transmitted to the management system 101.

In addition, according to an embodiment of the present disclosure, the metadata includes the information indicating the photographer. As a result, it is possible to guarantee that a provider of the image file is the photographer.

If the information indicating the photographer is the information indicating that the biometric authentication of the photographer has succeeded, it is possible to reliably guarantee that the provider of the image file is the photographer.

However, in the case that the biometric authentication of the photographer has failed, the processing of reacquiring the biometric information of the photographer is performed. As a result, it is possible to prevent an erroneous determination that the provider of the image file is not the photographer due to that accurate biometric information is not obtained.

In addition, in an embodiment of the present disclosure, the biometric information of the photographer is the finger-print information of the photographer, the retina information of the photographer, or the voice information of the photographer. As a result, it is possible to guarantee that the provider of the image file is the photographer in the image pickup apparatus 102 capable of acquiring the fingerprint information of the photographer, the retina information of the photographer, and the voice information of the photographer.

In the preferred embodiment of the present disclosure, when the photographing start operation (an instruction to generate a content) is accepted from the photographer, the biometric information of the photographer is acquired. As a result, it is possible to reliably acquire the biometric information of the photographer in acquiring the biometric information necessary for guaranteeing that the provider of the image file is the photographer.

In the preferred embodiment of the present disclosure, since the image file includes the image data obtained by photographing the subject, it is possible to guarantee that the provider of the image file is the photographer who is the subject.

In addition, in the preferred embodiment of the present disclosure, since the image data is the still image data or the moving image data, it is possible to guarantee that the provider of the image file including the still image data or the moving image data is the photographer.

It should be noted that in the preferred embodiment of the present disclosure, after performing the biometric authentication in the step S305, the image pickup apparatus 102 may cause the image display unit 207 to display the result of the biometric authentication. As a result, it is possible for the photographer to grasp (understand) the result of the biometric authentication in real time.

Figure 4:
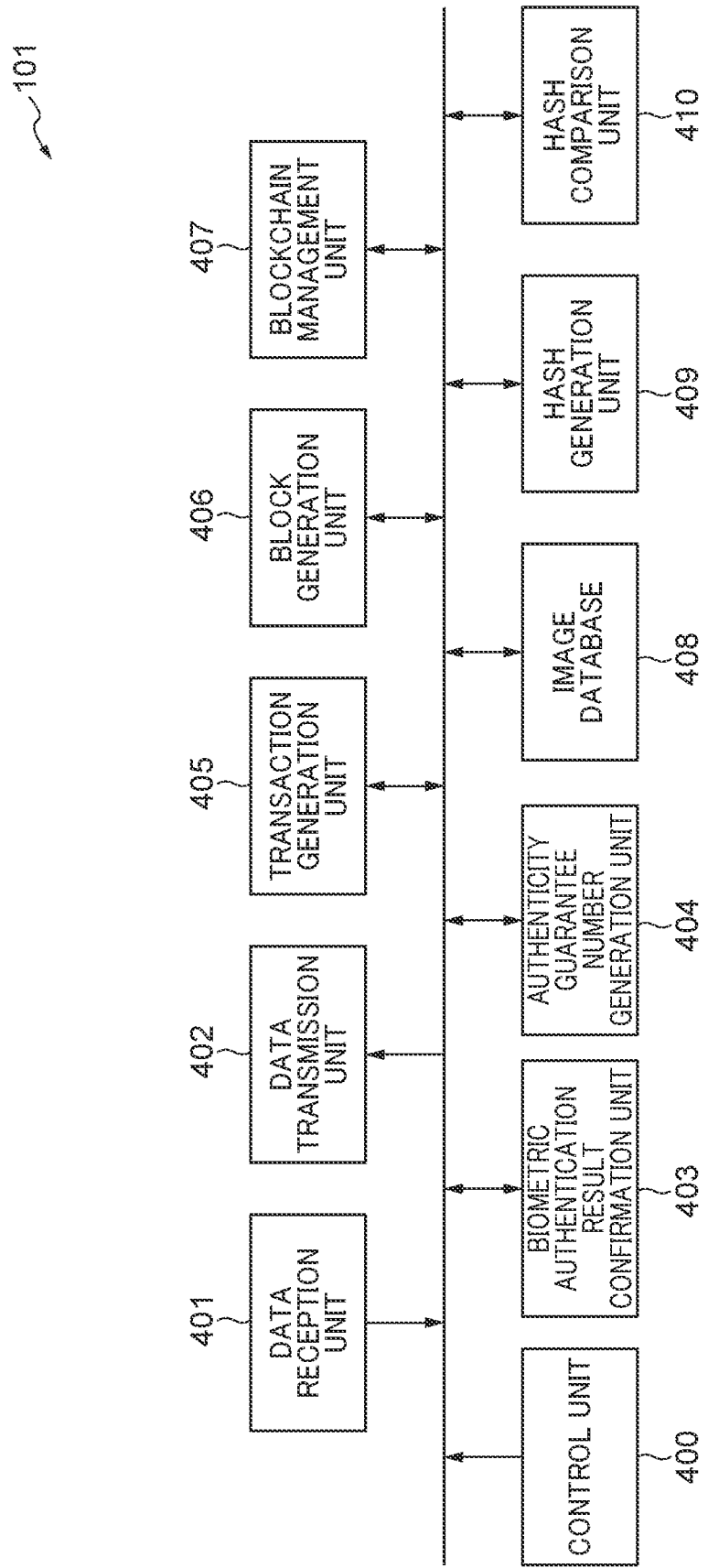
FIG. 4 is a block diagram that schematically shows a configuration of the management system shown in FIG. 1.

FIG. 4 is a block diagram that schematically shows a configuration of the management system 101 shown in FIG. 1. In the preferred embodiment of the present disclosure, the management system 101 includes one or a plurality of computers connected to the network.

As shown in FIG. 4, the management system 101 includes a control unit 400, a data reception unit 401, a data transmission unit 402, a biometric authentication result confirmation unit 403, an authenticity guarantee number generation unit 404, and a transaction generation unit 405. In addition, the management system 101 includes a block generation unit 406, a blockchain management unit 407, the image database 408, a hash generation unit 409, and a hash comparison unit 410.

The control unit 400 controls the entire management system 101.

The data reception unit 401 receives various types of data from the external apparatus. For example, the data reception unit 401 receives the hash value, the hash value calculation detailed information, and the image file from the image pickup apparatus 102. In addition, the data reception unit 401 receives the image file and the authenticity guarantee number that are used for performing the authenticity determination from the communication device 105*b* operated by the viewer of the image publishing site 103.

The data transmission unit 402 transmits various types of data to the external apparatus. For example, the data transmission unit 402 transmits the image file selected to be published on the image publishing site 103 and the authenticity guarantee number corresponding to the image file selected to be published on the image publishing site 103 to the communication device 105*a* operated by the user (for example, the photographer (the image provider)). In addition, the data transmission unit 402 transmits the result of the authenticity determination to the communication device 105b operated by the viewer who has made the authenticity confirmation request of the image file.

The biometric authentication result confirmation unit 403 confirms whether or not the data received from the image pickup apparatus 102 includes the information indicating that the biometric authentication of the photographer has succeeded, and determines whether the biometric authentication has succeeded or has failed. The result of the determination performed by the biometric authentication result confirmation unit 403 is registered in the image database 408.

Upon receiving the hash value and the image file from the image pickup apparatus 102, the authenticity guarantee number generation unit 404 generates the authenticity guarantee number, which is the unique number within the management system 101.

The transaction generation unit 405 generates the transaction data and broadcasts the transaction data to the one or more computers (the nodes) participating in the blockchain peer-to-peer network 104. The transaction data includes the hash value received from the image pickup apparatus 102, the authenticity guarantee number that is generated when receiving the hash value and is associated with the hash value, and the metadata included in the image file.

When the broadcasted transaction data is approved by the miner and the verification of the transaction data is completed, the block generation unit 406 generates the block, into which the transaction data has been written, and connects the generated block to the blockchain.

The blockchain management unit 407 manages the blockchain, which is also held by one or a plurality of computers (nodes) participating in the blockchain peer-to-peer network 104. In addition, the management system 101 and the nodes are synchronized so that the blockchains held by them always have the same contents.

The image file and the authenticity guarantee number corresponding to the image file are registered in the image database 408. Specifically, as shown in FIG. 5, the image database 408 includes a block ID 501, an authenticity guarantee number 502, an image file name 503, and biometric authentication result information 504, which are associated with each other.

A block ID (an identification (ID) number) sequentially issued is set in the block ID 501 every time a block, into which the image file has been written, is connected to the blockchain. That is, each block ID set in the block ID 501 corresponds to one of the hash values registered in the blockchain.

The authenticity guarantee number corresponding to the image file is set in the authenticity guarantee number 502.

A file name of the image file received by the management system 101 from the image pickup apparatus 102 or the like is set in the image file name 503.

The result of determining whether the biometric authentication has succeeded or has failed based on the data received from the image pickup apparatus 102 by the biometric authentication result confirmation unit 403 is set in the biometric authentication result information 504. For example, in the case that the metadata in the image file received from the image pickup apparatus 102 includes the information indicating that the biometric authentication of the photographer has succeeded, "success" indicating the success of the biometric authentication is set in the biometric authentication result information 504.

It should be noted that the configuration of the image database 408 is not limited to the above-described configuration, and the image database 408 may include other items.

Returning to FIG. 4, when performing the authenticity determination, the hash generation unit 409 generates the hash value by executing the hash function with respect to the image file transmitted from the communication device 105b of the user (the viewer) who has made the authenticity confirmation request.

The hash comparison unit 410 acquires a block (described below) corresponding to the authenticity guarantee number transmitted from the user who has made the authenticity confirmation request, from the blockchain managed by the blockchain management unit 407. The hash comparison unit 410 acquires the hash value (the image hash value) written into the block in the blockchain. The hash comparison unit 410 performs the authenticity determination by comparing the hash value acquired from the block with the hash value generated by the hash generation unit 409. In the case that the two hash values (the hash value acquired from the block and the hash value generated by the hash generation unit 409) are the same, the hash comparison unit 410 determines that the image file transmitted from the user who has made the authenticity confirmation request has not been falsified since the time of generation of the image file (determines that the image file transmitted from the user who has made the authenticity confirmation request is true). On the other hand, in the case that the two hash values are different from each other, the hash comparison unit 410 determines that the image file transmitted from the user who has made the authenticity confirmation request has been falsified since the time of generation of the image file (determines that the image file transmitted from the user who has made the authenticity confirmation request is not true, that is, is false).

For example, there is a case where the image file distributed from the image publishing site 103 to the communication device 105b has been falsified, and the falsified image file is transmitted to the management system 101 together with the authenticity confirmation request. In the case of receiving such an authenticity confirmation request, the hash value generated by the hash generation unit 409 by executing the hash function with respect to the falsified image file is different from the hash value generated based on the image file before the falsification. In addition, in the management system 101, the hash value stored in the blockchain cannot be changed by anyone. Therefore, in the case of receiving the above-described authenticity confirmation request, the hash value generated by the hash generation unit 409 by executing the hash function with respect to the falsified image file does not match the hash value stored in the block corresponding to the authenticity guarantee number of the authenticity confirmation request in the blockchain.

Figure 6:
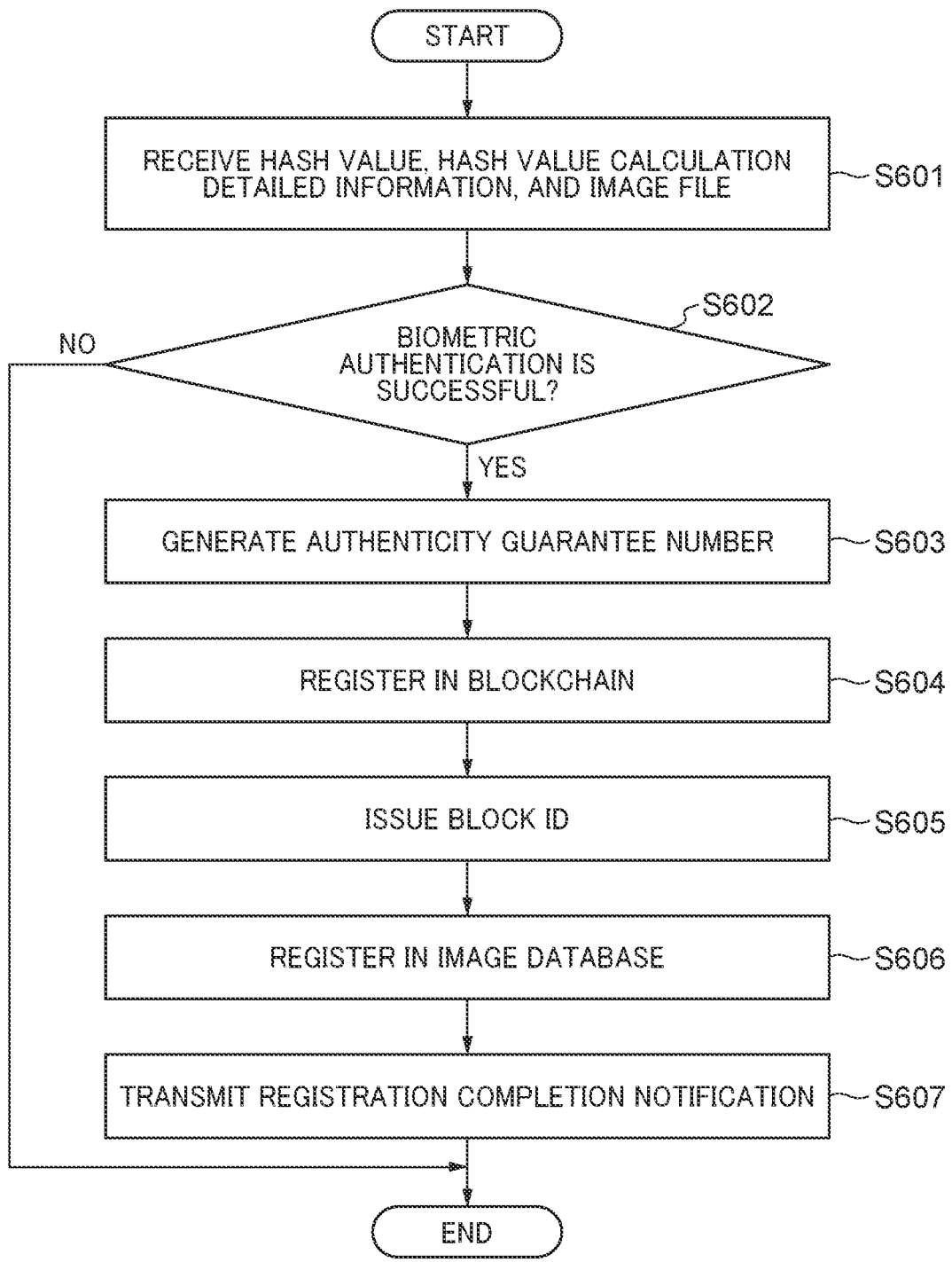
FIG. 6 is a flowchart that shows a procedure of a blockchain registration processing executed by the management system shown in FIG. 1.

FIG. 6 is a flowchart that shows a procedure of a blockchain registration processing executed by the management system 101 shown in FIG. 1. The blockchain registration processing shown in FIG. 6 is implemented by the control unit 400 executing a program stored in a recording medium included in the computer constituting the management system 101. The blockchain registration processing shown in FIG. 6 is executed, for example, when the data transmission processing shown in FIG. 3 is performed by the image pickup apparatus 102 and the hash value and the image file are transmitted from the image pickup apparatus 102 by the processing performed in the step S311. Here, a case that the hash value calculation detailed information is generated in the step S310 and the hash value calculation detailed information is transmitted to the management system 101 together with the hash value and the image file in the step S311 will be described.

As shown in FIG. 6, the control unit 400 receives the hash value, the hash value calculation detailed information, and the image file from the image pickup apparatus 102 (a step S601). In the case that the received data has been subjected to the encryption processing (the received data is encrypted), the control unit 400 performs a decryption processing with respect to the received data. Thereafter, the control unit 400 stores the information of the image file such as the metadata included in the received image file, the hash value, and the hash value calculation detailed information in a random access memory (RAM) (not shown).

Next, the control unit 400 functioning as a determination unit controls the biometric authentication result confirmation unit 403 to determine whether or not the biometric authentication of the photographer has succeeded based on the metadata included in the image file received in the step S601 (a step S602). For example, in the case that the metadata does not include the information indicating that the biometric authentication of the photographer has succeeded, the control unit 400 determines in the step S602 that the biometric authentication of the photographer has not succeeded. In this case, the blockchain registration processing shown in FIG. 6 is ended. That is, in the preferred embodiment of the present disclosure, the metadata that does not include the information indicating that the biometric authentication of the photographer has succeeded will not be registered in the blockchain.

On the other hand, in the case that the metadata includes the information indicating that the biometric authentication of the photographer has succeeded, the control unit 400 determines in the step S602 that the biometric authentication of the photographer has succeeded. In this case, the processing proceeds to a step S603 described below. In the step S603, the control unit 400 controls the authenticity guarantee number generation unit 404 to generate the authenticity guarantee number of the received image file.

It should be noted that furthermore, in the step S602, the control unit 400 applies the hash function to the image file received in the step S601 to calculate a hash value, and compares the calculated hash value with the hash value received in the step S601 to determine whether or not they coincide with each other. As the result of the determination, in the case that they coincide with each other, the processing may proceed to the step S603, and on the other hand, in the case that they do not coincide with each other, the blockchain registration processing shown in FIG. 6 may be ended. Accordingly, the generation of the authenticity guarantee number is performed only in the case that the image file received in the step S601 can be regarded as being transmitted from a device (the image pickup apparatus) photographing and recording the image file and calculating the hash value.

Next, the control unit 400 functioning as a registration unit registers the authenticity guarantee number generated in the step S603 and the information of the image file such as the hash value, the hash value calculation detailed information, and the metadata stored in the RAM in the step S601 in the blockchain (a step S604). Specifically, first, the transaction generation unit 405 generates the transaction data including the authenticity guarantee number, the hash value, the hash value calculation detailed information, and the metadata. Next, the transaction generation unit 405 broadcasts the transaction data to the one or more computers (the nodes) participating in the blockchain peer-to-peer network 104. When the broadcasted transaction data is approved by the miner and the verification thereof is completed, the block generation unit 406 generates the block, into which the verified transaction data has been written, and connects (registers) the generated block to (in) the blockchain.

Next, the control unit 400 issues a block ID corresponding to the block (a step S605). Here, the control unit 400 issues a value, which is generated by executing the hash function with respect to a header of the block twice, as the block ID. It should be noted that although the block ID is used to refer to the block, there is no field of the block ID within the block.

Next, the control unit 400 associates the issued block ID, the image file received in the step S601, and the authenticity guarantee number generated in the step S603 with each other and registers them in the image database 408 (a step S606). Next, the control unit 400 transmits the registration completion notification, which indicates that the processing of registering the information of the image file in the blockchain is completed, to the image pickup apparatus 102 (a step S607). Thereafter, the blockchain registration processing is ended.

As described above, in the preferred embodiment of the present disclosure, whether or not the biometric authentication of the photographer has succeeded is determined based on the metadata included in the image file received in the step S601. In the case of being determined that the biometric authentication of the photographer has succeeded, the information of the image file and the authenticity guarantee number are registered in the blockchain. As a result, the management system 101 can register those image files, for which the biometric authentication of the photographer has succeeded, among the received image files in the blockchain, and thus it is possible to guarantee that the provider of the image file is the photographer.

Figure 7:
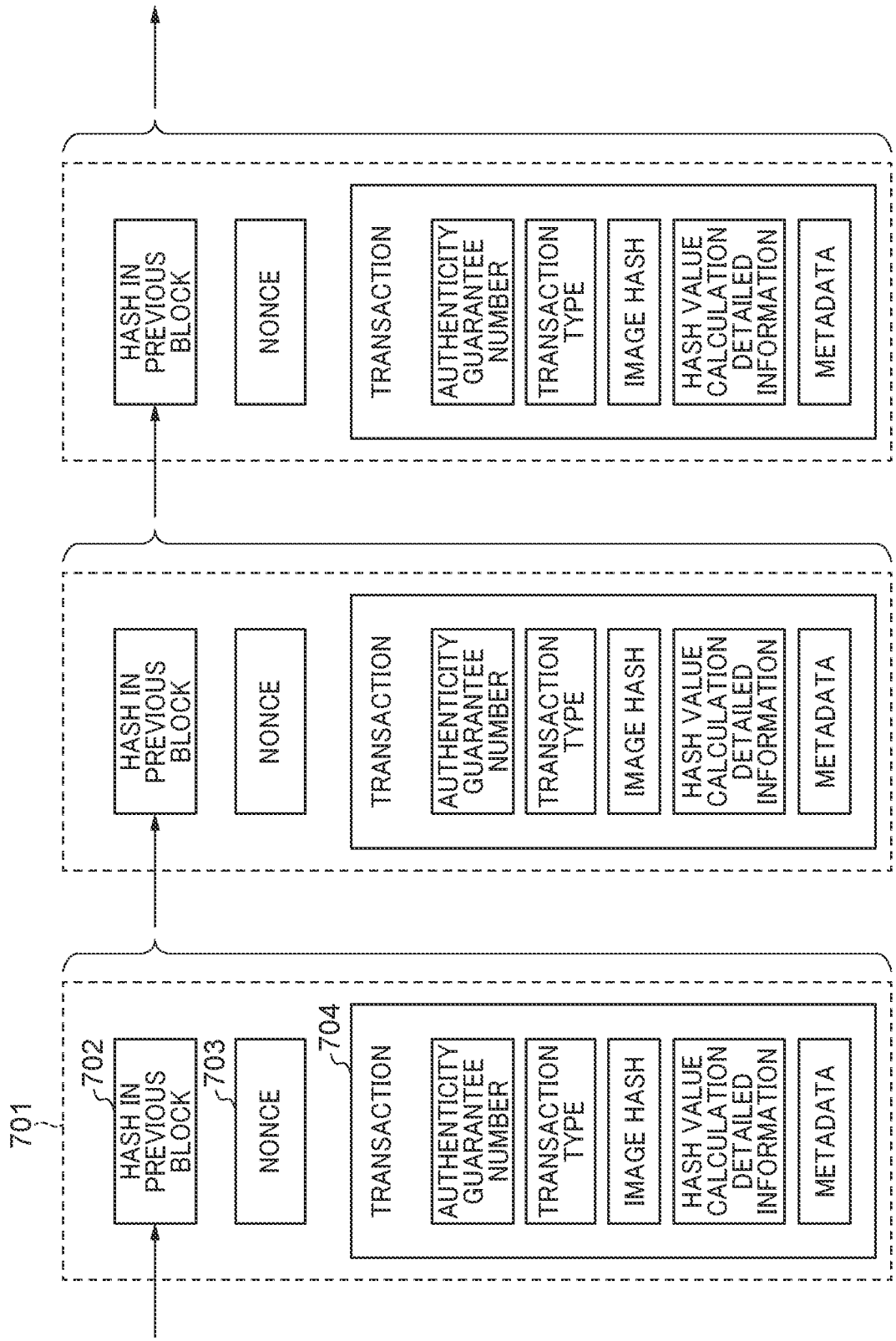
FIG. 7 is a diagram that shows an example of a block data structure of a blockchain managed by a blockchain management unit shown in FIG. 4.

FIG. 7 is a diagram that shows an example of a block data structure of the blockchain managed by the blockchain management unit 407 shown in FIG. 4. As shown in FIG. 7, the blockchain is a database formed by connecting blocks like chains in time series. A block 701 connected to the blockchain includes a hash in the previous block 702, a nonce 703, and a transaction 704.

The hash in the previous block (the hash of the previous block) 702 is a hash value of the block connected to the blockchain one block before the block 701.

The nonce 703 is a nonce value used for mining.

The transaction 704 is the transaction data generated by the transaction generation unit 405, and includes a transaction type, an image hash, the authenticity guarantee number, the hash value calculation detailed information, and the metadata.

The transaction type is information indicating the type of the transaction. An internal structure of the transaction varies depending on the transaction type.

The image hash is a hash value transmitted from the image pickup apparatus 102 to the management system 101.

The authenticity guarantee number is an authenticity guarantee number generated by the management system 101 when the image hash is transmitted from the image pickup apparatus 102 to the management system 101.

The hash value calculation detailed information is a hash value transmitted from the image pickup apparatus 102 to the management system 101.

The metadata is metadata included in the image file transmitted from the image pickup apparatus 102 to the management system 101.

Figure 8:
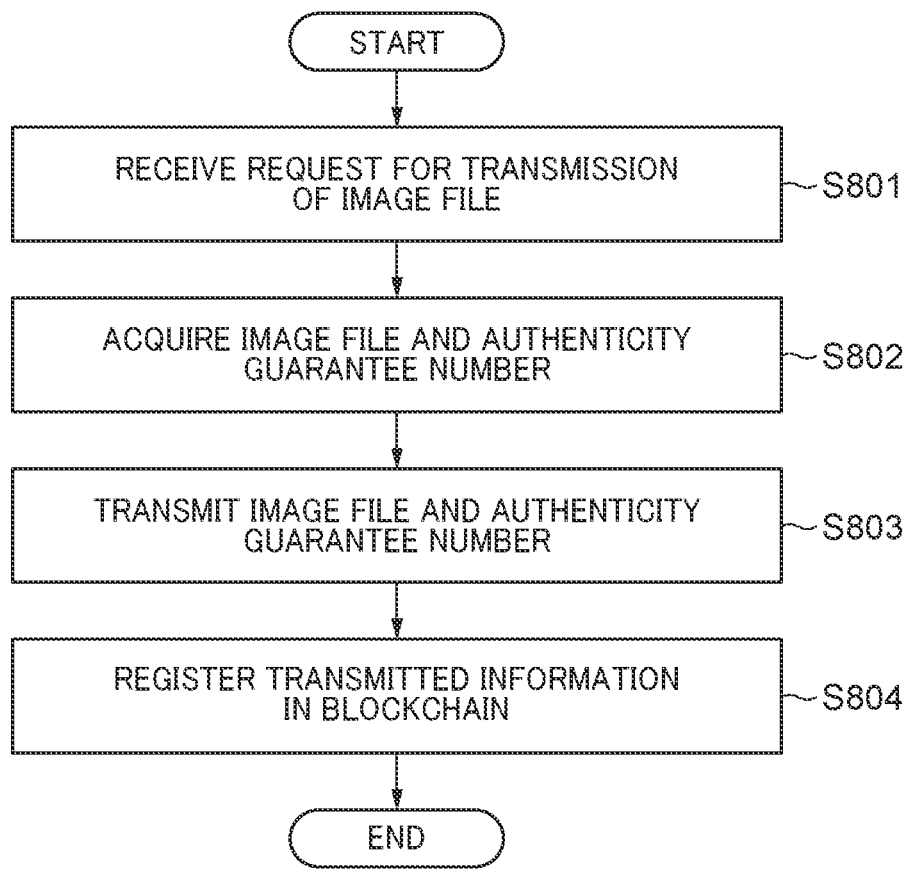
FIG. 8 is a flowchart that shows a procedure of an image data transmission processing to an image publishing site executed by the management system shown in FIG. 1.

FIG. 8 is a flowchart that shows a procedure of an image data transmission processing to the image publishing site 103 executed by the management system 101 shown in FIG. 1. The image file transmission processing shown in FIG. 8 is also implemented by the control unit 400 executing a program stored in the recording medium included in the computer constituting the management system 101. The image file transmission processing shown in FIG. 8 is executed, for example, when the user (for example, the photographer) selects one of the plurality of image files registered in the image database 408 by using the communication device 105*a* and makes a request to transmit the image file to the image publishing site 103 (a transmission request). The transmission request includes the block ID associated with the image file selected by the user in the image database 408.

As shown in FIG. 8, first, the control unit 400 causes the data reception unit 401 to receive the transmission request from the communication device 105*a* operated by the user (a step S801).

Next, the control unit 400 acquires the image file that is a target of the transmission request and the authenticity guarantee number of the image file from the image database 408 (a step S802). Specifically, the control unit 400 acquires the image file and the authenticity guarantee number corresponding to the block ID included in the transmission request from the image database 408.

Next, the control unit 400 causes the data transmission unit 402 to transmit the acquired image file and the acquired authenticity guarantee number to the image publishing site 103 (a step S803). At the same time, the control unit 400 notifies the communication device 105*a* (a request source of the transmission request) of the user who has made the transmission request that the image file that is the target of the transmission request can be published on the image publishing site 103.

Next, the control unit 400 registers transmission information (transmitted information) of the image file in the blockchain (a step S804). Specifically, first, the transaction generation unit 405 generates the transaction data including the authenticity guarantee number, the transmission information of the image file, the image data, and information (such as a uniform resource locator (URL)) indicating a transmission destination of the authenticity guarantee number. Next, the transaction generation unit 405 broadcasts the transaction data to the one or more computers (the nodes) participating in the blockchain peer-to-peer network 104. When the broadcasted transaction data is approved by the miner and the verification thereof is completed, the block generation unit 406 generates the block, into which the verified transaction data has been written, and connects the generated block to the blockchain. Thereafter, the image file transmission processing is ended.

As described above, in the image file transmission processing shown in FIG. 8, when the image file is transmitted from the management system 101 to the image publishing site 103 in response to the transmission request from the user, the user is notified that the image file can be published on the image publishing site 103. At the same time, the transmission information of the image file is registered in the blockchain. Therefore, it becomes possible for the user to grasp the usage status of the image file.

Figure 9:
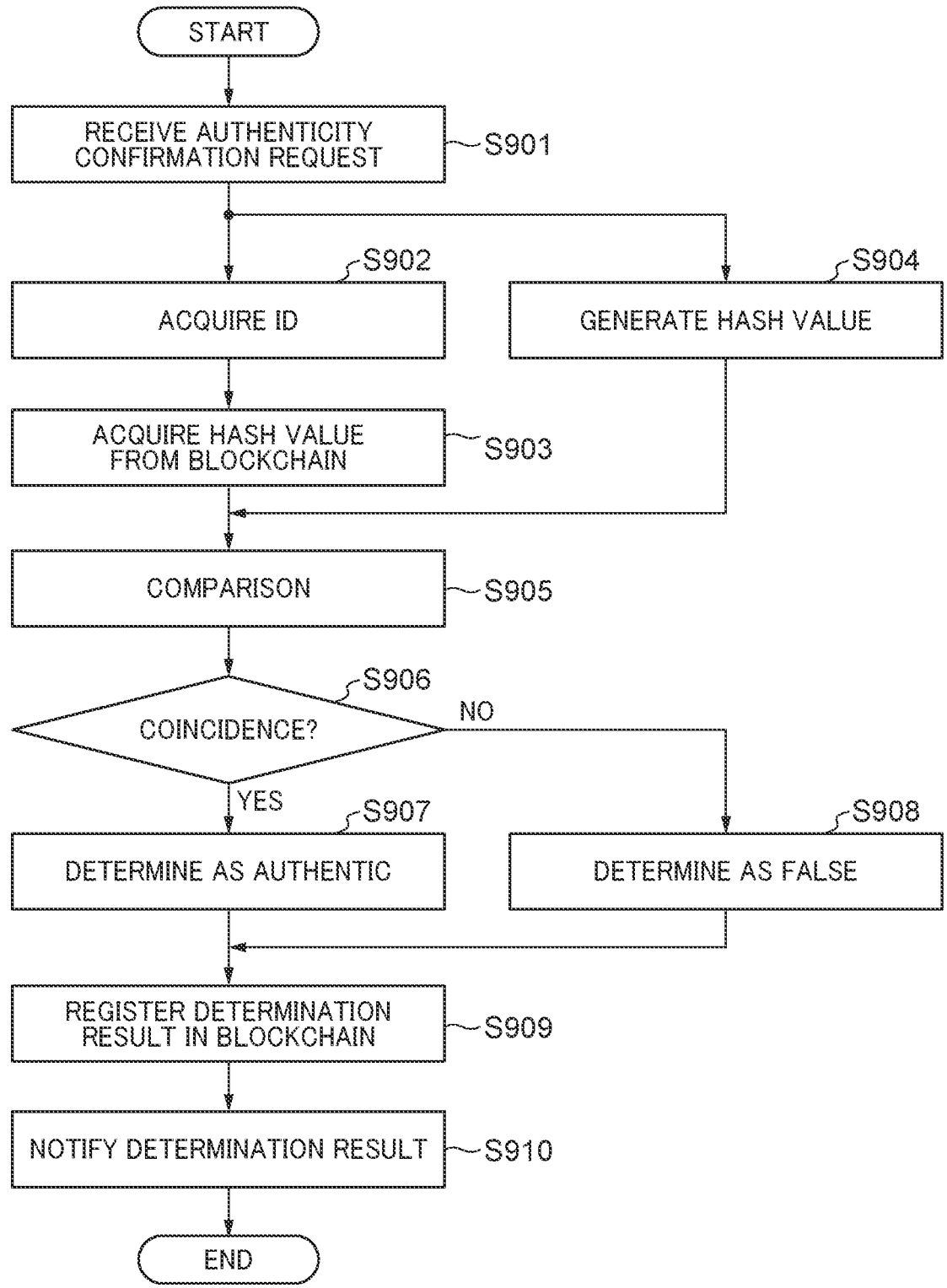
FIG. 9 is a flowchart that shows a procedure of an authenticity determination processing executed by the management system shown in FIG. 1.

FIG. 9 is a flowchart that shows a procedure of an authenticity determination processing executed by the management system 101 shown in FIG. 1. The authenticity determination processing shown in FIG. 9 is also implemented by the control unit 400 executing a program stored in the recording medium included in the computer constituting the management system 101. It should be noted that the authenticity determination processing shown in FIG. 9 is executed when the viewer of the image publishing site 103 operates the communication device 105*b* to make the authenticity confirmation request of the image file displayed on the image publishing site 103 to the management system 101, but is not limited to this.

As shown in FIG. 9, the control unit 400 causes the data reception unit 401 to receive the authenticity confirmation request from the communication device 105*b* operated by the viewer (a step S901). At the time of receiving the authenticity confirmation request, the control unit 400 also causes the data reception unit 401 to receive the image file that is the target of the authenticity determination and the authenticity guarantee number corresponding to the image file.

Next, the control unit 400 makes an inquiry to the image database 408 by using the authenticity guarantee number received in the step S901 as a key to acquire the block ID corresponding to the authenticity guarantee number (a step S902).

Next, the control unit 400 accesses the block corresponding to the acquired block ID in the blockchain, and acquires the hash value (the image hash value) stored in the block (a step S903).

Further, concurrently with the processes of the steps S902 and S903, the control unit 400 causes the hash generation unit 409 to execute the hash function with respect to the image file received in the step S901 (a step S904). As a result, the control unit 400 causes the hash generation unit 409 to generate (acquire) the hash value. At this time, the control unit 400 accesses the block corresponding to the acquired block ID among a plurality of blocks constituting the blockchain to acquire the hash value calculation detailed information stored in the block. In the step S904, the hash value is generated with reference to the hash value calculation detailed information.

When the processes of the steps S902 to S904 are completed, the control unit 400 causes the hash comparison unit 410 to compare the image hash value acquired in the step S903 with the hash value generated in the step S904 (a step S905).

The control unit 400 determines whether or not the two hash values (the image hash value acquired in the step S903 and the hash value generated in the step S904) compared in the step S905 coincide with each other (a step S906).

As the result of the determination performed in the step S906, in the case that the two hash values coincide with each other, the control unit 400 determines that the image file received in the step S901 is "true" indicating that the image file received in the step S901 has not been falsified since the time of generation of the image file (a step S907). Thereafter, the processing proceeds to a step S909.

On the other hand, as the result of the determination performed in the step S906, in the case that the two hash values do not coincide with each other, the control unit 400 determines that the image file received in the step S901 is "false" indicating that the image file received in the step S901 has been falsified since the time of generation of the image file (a step S908). Thereafter, the processing proceeds to the step S909.

Next, the control unit 400 controls the block generation unit 406 to register the determination result obtained in the step S907 or the step S908 in the blockchain (a step S909). Specifically, the block generation unit 406 generates a block, into which the determination result obtained in the step S907 or the step S908 has been written, and connects the generated block to the blockchain.

Next, the control unit 400 controls the data transmission unit 402 to notify the communication device 105b that is a request source of the authenticity confirmation request of the determination result obtained in the step S907 or the step S908 (a step S910), and ends the authenticity determination processing shown in FIG. 9.

It should be noted that in the preferred embodiment of the present disclosure, as the information indicating the photographer, the biometric information of the photographer may be transmitted to the management system 101 instead of the information indicating that the biometric authentication of the photographer has succeeded. The management system 101 controls a biometric authentication unit (not shown) included in the management system 101 to perform the biometric authentication of the photographer based on the biometric information of the photographer received. In addition, the management system 101 performs the determination of the step S602 based on the result of the biometric authentication of the photographer. As a result, it is possible to cause the management system 101 to perform the determination of whether or not the provider of the image file is the photographer, and thus, it is possible to distribute a load of processing related to a control for guaranteeing that the provider of the image file is the photographer.

In addition, in the above-described preferred embodiment of the present disclosure, although the configuration, in which the image file including the image data and the metadata including the information indicating the photographer is transmitted to the management system 101, has been described, the present disclosure is not limited to this configuration. For example, the information indicating the photographer may be transmitted to the management system 101 as individual data without being included in the metadata.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., ASIC) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-137142, filed on Aug. 30, 2022, which is hereby incorporated by reference herein in its entirety.

What is claimed is:

1. A management server that manages a content generated by a content generation apparatus according to an instruction received from a user, the management server comprising:
at least one memory storing programs; and
at least one processor that executes the stored programs, which cause the at least one processor to:
receive the content, information of the content, and a hash value of the content;
determine whether or not biometric authentication of the user who has instructed generation of the content has succeeded based on result information indicating a result of the biometric authentication of the user included in the information of the content;
generate a hash value based on the content and the information of the content; and
register, in a case that the received hash value and the generated hash value coincide with each other and it is determined that the biometric authentication of the user has succeeded, the hash value and the information of the content in a blockchain.

2. The management server according to claim 1, wherein the information of the content is metadata of the content, and
the hash value is generated based on the content and the metadata of the content.

3. The management server according to claim 2, wherein the metadata includes attribute information of the content and result information of the biometric authentication of the user.

4. The management server according to claim 1, wherein the at least one processor is further configured to:
generate, in the case that the received hash value and the generated hash value coincide with each other and it is determined that the biometric authentication of the user has succeeded, an identification number for the content, and
register the identification number in the blockchain.

5. A control method for a management server that manages a content generated by a content generation apparatus according to an instruction received from a user, the control method comprising:
receiving the content, information of the content, and a hash value of the content;
determining whether or not biometric authentication of the user who has instructed generation of the content has succeeded based on result information indicating a result of the biometric authentication of the user included in the information of the content;
generating a hash value based on the content and the information of the content; and
registering the hash value and the information of the content in a blockchain, in a case that the received hash value and the generated hash value coincide with each other and it is determined that the biometric authentication of the user has succeeded.

6. A non-transitory computer-readable storage medium storing a program for causing a computer to execute a control method for a management server that manages a content generated by a content generation apparatus according to an instruction received from a user, the control method comprising:

receiving the content, information of the content, and a hash value of the content;

determining whether or not biometric authentication of the user who has instructed generation of the content has succeeded based on result information indicating a result of the biometric authentication of the user included in the information of the content;

generating a hash value based on the content and the information of the content; and registering the hash value and the information of the content in a blockchain, in a case that the received hash value and the generated hash value coincide with each other and it is determined that the biometric authentication of the user has succeeded.

\* \* \* \* \*